US008396988B2

(12) United States Patent
Uttaro

(10) Patent No.: US 8,396,988 B2
(45) Date of Patent: Mar. 12, 2013

(54) METHOD AND SYSTEM FOR SURVIVAL OF DATA PLANE THROUGH A TOTAL CONTROL PLANE FAILURE

(75) Inventor: James Uttaro, Staten Island, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 584 days.

(21) Appl. No.: 12/002,873

(22) Filed: Dec. 19, 2007

(65) Prior Publication Data

US 2009/0164835 A1 Jun. 25, 2009

(51) Int. Cl.
*G06F 11/14* (2006.01)
(52) U.S. Cl. ............. 709/239; 714/4.1; 714/4.2; 714/37
(58) Field of Classification Search .................. 709/238, 709/239; 713/153; 398/57; 379/272; 370/217, 370/216, 221; 455/445; 714/4, 37, E11.141, 714/E11.021
See application file for complete search history.

(56) References Cited

U.S. PATENT DOCUMENTS

| 6,339,595 | B1 * | 1/2002 | Rekhter et al. ............... | 370/392 |
|---|---|---|---|---|
| 6,654,882 | B1 * | 11/2003 | Froutan et al. ............... | 713/153 |
| 6,744,739 | B2 * | 6/2004 | Martin ............... | 370/254 |
| 6,813,644 | B1 * | 11/2004 | Jamieson et al. ............... | 709/242 |
| 6,865,611 | B1 * | 3/2005 | Bragg ............... | 709/238 |
| 6,963,575 | B1 * | 11/2005 | Sistanizadeh et al. ........ | 370/404 |
| 7,688,714 | B2 * | 3/2010 | Nalawade et al. ............ | 370/217 |
| 7,822,027 | B2 * | 10/2010 | Yadav et al. ............... | 370/389 |
| 7,860,115 | B1 * | 12/2010 | Scudder et al. ............... | 370/401 |
| 8,179,905 | B1 * | 5/2012 | Napierala et al. ............ | 370/401 |
| 8,238,338 | B2 * | 8/2012 | Swallow et al. ............... | 370/392 |
| 2003/0012145 | A1 * | 1/2003 | Bragg ............... | 370/254 |
| 2004/0081154 | A1 * | 4/2004 | Kouvelas ............... | 370/392 |
| 2006/0083215 | A1 | 4/2006 | Uttaro | |
| 2006/0092940 | A1 * | 5/2006 | Ansari et al. ............... | 370/392 |
| 2006/0140136 | A1 | 6/2006 | Filsfils et al. | |
| 2006/0182038 | A1 | 8/2006 | Nalawade et al. | |
| 2006/0233181 | A1 * | 10/2006 | Raszuk et al. ............... | 370/401 |

(Continued)

FOREIGN PATENT DOCUMENTS

| EP | 1 376 988 | | 1/2004 |
|---|---|---|---|
| EP | 1463247 A2 | * | 9/2004 |
| EP | 1 331 772 B1 | | 3/2006 |
| JP | 2004228885 A | * | 8/2004 |
| WO | WO 2007003088 A1 | * | 1/2007 |

OTHER PUBLICATIONS

Feamster et al., A Model of BGP Routing for Network Engineering, SIGMETRICS/Performance '04, Jun. 12-16, 2004, New York, NY.*

(Continued)

*Primary Examiner* — Wing F Chan
*Assistant Examiner* — Kostas Katsikis

(57) ABSTRACT

A system and method for retaining routes in a control plane learned by an inter-domain routing protocol in the event of a connectivity failure between routers. Routers are classified as either route reflectors or originators. A connectivity failure between two routers is determined. A determination is then made whether to propagate a withdrawal of learned routes based on whether the connectivity failure occurred between a route reflector and an originator, two originators, or two route reflectors. A withdrawal of learned routes is propagated to neighboring routers if the connectivity failure occurred between two originators, or between a route reflector and an originator that is inaccessible via an intra-domain routing protocol. No withdrawal of learned routes is propagated if the connectivity failure occurred between two route reflectors, or between a route reflector and an originator that is accessible via an intra-domain routing protocol.

16 Claims, 4 Drawing Sheets

U.S. PATENT DOCUMENTS

| | | | | |
|---|---|---|---|---|
| 2006/0245374 | A1* | 11/2006 | Patel et al. | 370/254 |
| 2006/0256724 | A1 | 11/2006 | Martini et al. | |
| 2007/0086461 | A1 | 4/2007 | Ward et al. | |
| 2007/0091796 | A1* | 4/2007 | Filsfils et al. | 370/228 |
| 2007/0112975 | A1* | 5/2007 | Cassar | 709/239 |
| 2007/0162614 | A1* | 7/2007 | Patel et al. | 709/239 |
| 2007/0183409 | A1 | 8/2007 | Bennet | |
| 2007/0214280 | A1* | 9/2007 | Patel et al. | 709/239 |
| 2008/0062986 | A1* | 3/2008 | Shand et al. | 370/392 |
| 2008/0089231 | A1* | 4/2008 | Appanna et al. | 370/235 |

OTHER PUBLICATIONS

Baykal et al., "An IP multicast handoff scheme with focus on IGMP sourced latency," High Speed Networks and Multimedia Communications 5th IEEE International Conference on , vol., no., pp. 361-364, 2002.*

Hardjono, et al., "Key establishment for IGMP authentication in IP multicast," Universal Multiservice Networks, 2000. ECUMN 2000. 1st European Conference on , vol., no., pp. 247-252, 2000.*

* cited by examiner

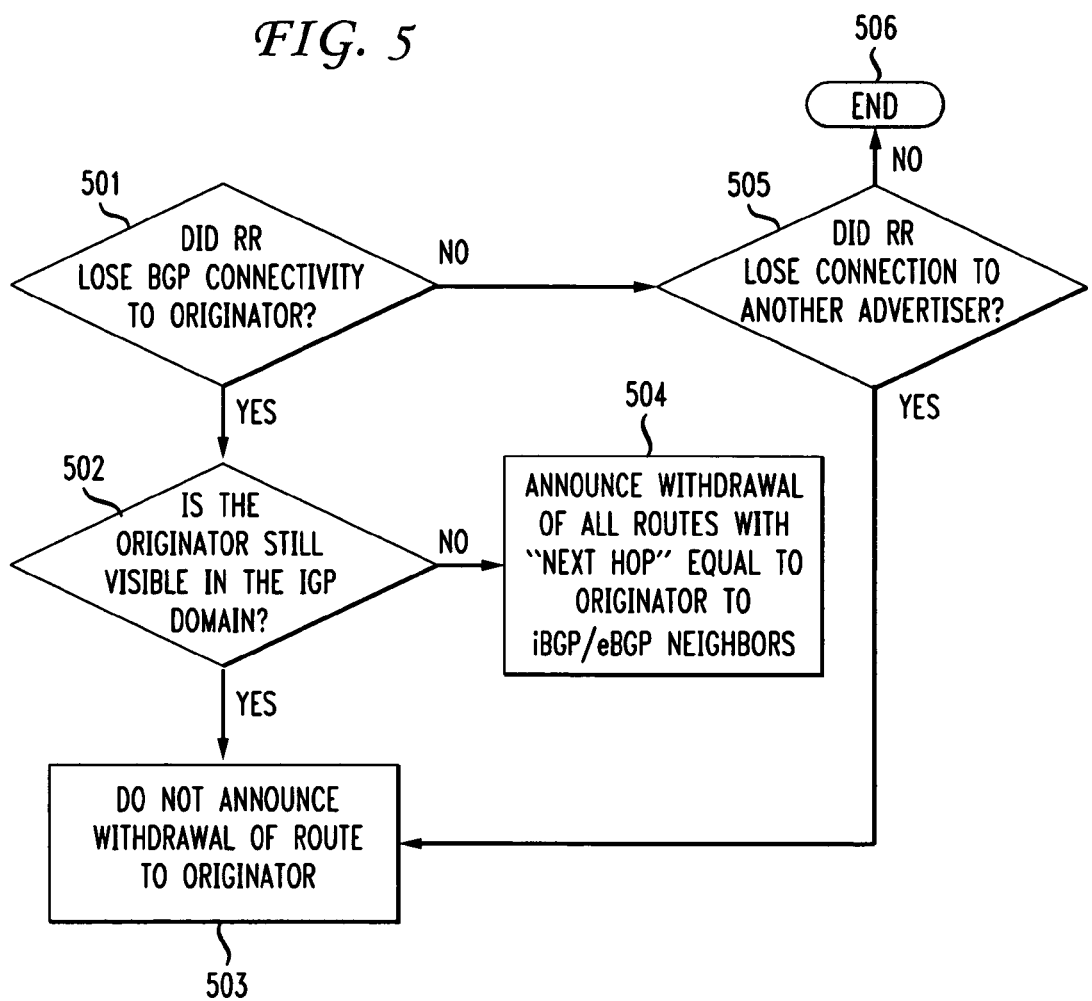

METHOD AND SYSTEM FOR SURVIVAL OF DATA PLANE THROUGH A TOTAL CONTROL PLANE FAILURE

BACKGROUND OF THE INVENTION

This application relates generally to communication networks, and more particularly, to a method and system for retaining learned routes in the event of a routing protocol connectivity failure between intermediate routers in a communication network.

Computer network data communication involves the exchange of data between two or more entities interconnected by communication links and sub-networks. Routers interconnect the communication links and subnets to enable transmission of data between end nodes. Communication software executing on routers correlates and manages data communication with other routers. The routers typically communicate by exchanging discrete messages or packets of data according to predefined protocols, such as the Transmission Control Protocol/Internet Protocol ("TCP/IP"). A protocol consists of a set of rules defining how the routers interact with each other. In addition, network routing software executing on the intermediate routers allows expansion of communication to other nodes. Collectively, these hardware and software components comprise a collection of communication networks.

Since management of data communication networks can prove burdensome, smaller groups of one or more computer networks can be maintained as separate routing domains or autonomous systems ("AS"). An AS is a network or group of networks under a shared technical administration and with common routing policies. An Internet Service Provider ("ISP") is an example of an AS that interconnects dispersed networks to provide Internet connectivity.

Interior Gateway Protocols ("IGPs"), such as conventional link-state protocols, are intra-domain routing protocols that define the manner with which routing information and network-topology information are exchanged and processed within a particular AS. Examples of conventional link-state protocols include, but are not limited to, the Open Shortest Path First ("OSPF") protocol and the Intermediate-System-to-Intermediate-System ("ISIS") protocol.

A plurality of interconnected AS domains may be configured to exchange messages in accordance with an inter-domain routing protocol, such as the Border Gateway Protocol ("BGP"). BGP allows each AS to independently create its own routing policies to override distance metrics when appropriate. To address this flexibility, BGP advertises routes for carrying data to the address space indicated by the IP prefix of the announced route. When a BGP router advertises to a neighbor that it has a path for reaching a specific IP prefix, the neighbor has a high degree of confidence that the advertising BGP router will actively use the specific path to reach the target destination. The popularity of BGP is due, in part, to its ability to distribute reachability information selecting the best route to each destination according to policies specified for each AS.

To implement the BGP protocol, each routing domain can include at least one provider edge ("PE") router that advertises routes to a PE router of another AS. Before transmitting such messages, however, the PE routers cooperate to establish a logical "peer" connection or session. These PE routers are also known as "originators" or "BGP speakers." Two BGP speakers with an open BGP session for the purpose of exchanging routing information are referred to as "peers" or "neighbors." BGP typically performs routing between AS domains by exchanging routing information among BGP speakers of each AS. BGP speakers also send update messages whenever a change in the topology occurs. For example, if a route is no longer accessible for any reason, a withdrawal of that route is propagated among the peers, which can delete a route from a router's control plane. BGP relies on pre-existing connectivity provided by IGP routes.

Two BGP enabled PE routers not in the same AS can use external BGP ("eBGP") to exchange routes. The routing information exchanged by eBGP neighbors typically includes the address of a PE router in another AS, which is also known as the "next hop" address. When a BGP speaker receives updates from multiple AS domains describing different paths to the same destination, the speaker typically chooses a single best path for reaching that destination. Once chosen, the speaker can use internal BGP ("iBGP") to propagate that best path to its AS neighbors, including the "next hop" associated with that best path. Each route advertised by BGP must have a "next hop" address that is reachable through IGP in order for that route to be considered valid. iBGP speakers within an AS are typically required to connect in full mesh to ensure that all iBGP speakers receive route updates from other iBGP speakers. However, the full mesh requirement can become very burdensome in more complex topologies.

Existing networks have alleviated this limitation by the use of advertisers or route reflectors ("RR"), which are special routers acting as a focal point for iBGP sessions. Multiple iBGP speakers can establish an iBGP peer with one RR, rather than establish an iBGP peering session with every other node in full mesh. The RR can take responsibility of re-advertising or "reflecting" learned routes from another BGP speaker within an AS.

In existing systems, the current implementation of BGP treats an originator and advertiser ("RR") of a route equally in the event that there is a loss of BGP connectivity between routers. Such existing systems using the current implementation of BGP will withdraw all routes toward a particular "next hop" when there is a BGP connectivity failure between BGP speakers or an iBGP connectivity failure between an advertiser and one of its peers within an AS, regardless of whether the "next hop" is still accessible via IGP.

One approach to mitigating the effects of a BGP session failure is a BGP extension known as graceful restart, which drops control plane connections to its routing peers for a short time, during which traffic forwarding continues, and restarts the control plane with a new instance of the routing tables. For graceful restart to be successful, all peers must have compatible graceful restart extensions that are negotiated during start up. This compatibility requirement becomes problematic in more complex topologies. Furthermore, graceful restart unnecessarily drops the control plane connection when an intermediate advertiser or RR fails, but the route originator is still accessible via IGP.

Thus, it is desirable to have a local solution requiring no extension compatibility between peers that can differentiate between the failure of an originator and an advertiser. Such a solution would retain routes learned from an intermediate advertiser or RR if the originator is still reachable via IGP, notwithstanding its BGP session termination.

BRIEF SUMMARY OF THE INVENTION

A system and method for retaining routes in a control plane learned by an inter-domain routing protocol in the event of a connectivity failure between routers. Routers are classified as either route reflectors or originators. A determination is made whether the connectivity failure occurred between a route reflector and an originator, two originators, or two route reflectors. A determination is then made whether to propagate a withdrawal of learned routes based on whether the connectivity failure occurred between a route reflector and an originator, two originators, or two route reflectors. A withdrawal of learned routes is propagated to neighboring routers if the connectivity failure occurred between two originators, or between a route reflector and an originator that is inaccessible via an intra-domain routing protocol. No withdrawal of learned routes is propagated if the connectivity failure occurred between two route reflectors, or between a route reflector and an originator that is accessible via an intra-domain routing protocol.

BRIEF DESCRIPTION OF THE DRAWINGS

FIG. 5 is a flow chart illustrating a main sequence of steps performed by an advertiser for withdrawing or retaining routes depending on whether the originator or an advertiser has failed.

DETAILED DESCRIPTION

A system and method for retaining learned routes in a data communication network despite a routing protocol (e.g., BGP) session failure are disclosed herein. Such networks include, but are not limited to, a network of routers running IGP protocols (e.g., OSPF, ISIS, iBGP, etc.), route advertising protocols (e.g., BGP, eBGP, iBGP, etc.), or a network supporting Virtual Private Network ("VPN") services using BGP protocol. The disclosed system and method can distinguish whether a route was learned from an originator (e.g., a provider edge ("PE") router) or an advertiser (i.e., a route reflector ("RR")). The method can be implemented in a router as part of a BGP program suite or installed separately. Although the system and method are described in the context of BGP—which has become a de facto standard for facilitating communications between routers in different ASs—it is understood that this disclosure is not limited to BGP and can also be implemented with other routing protocols.

Figure 1:
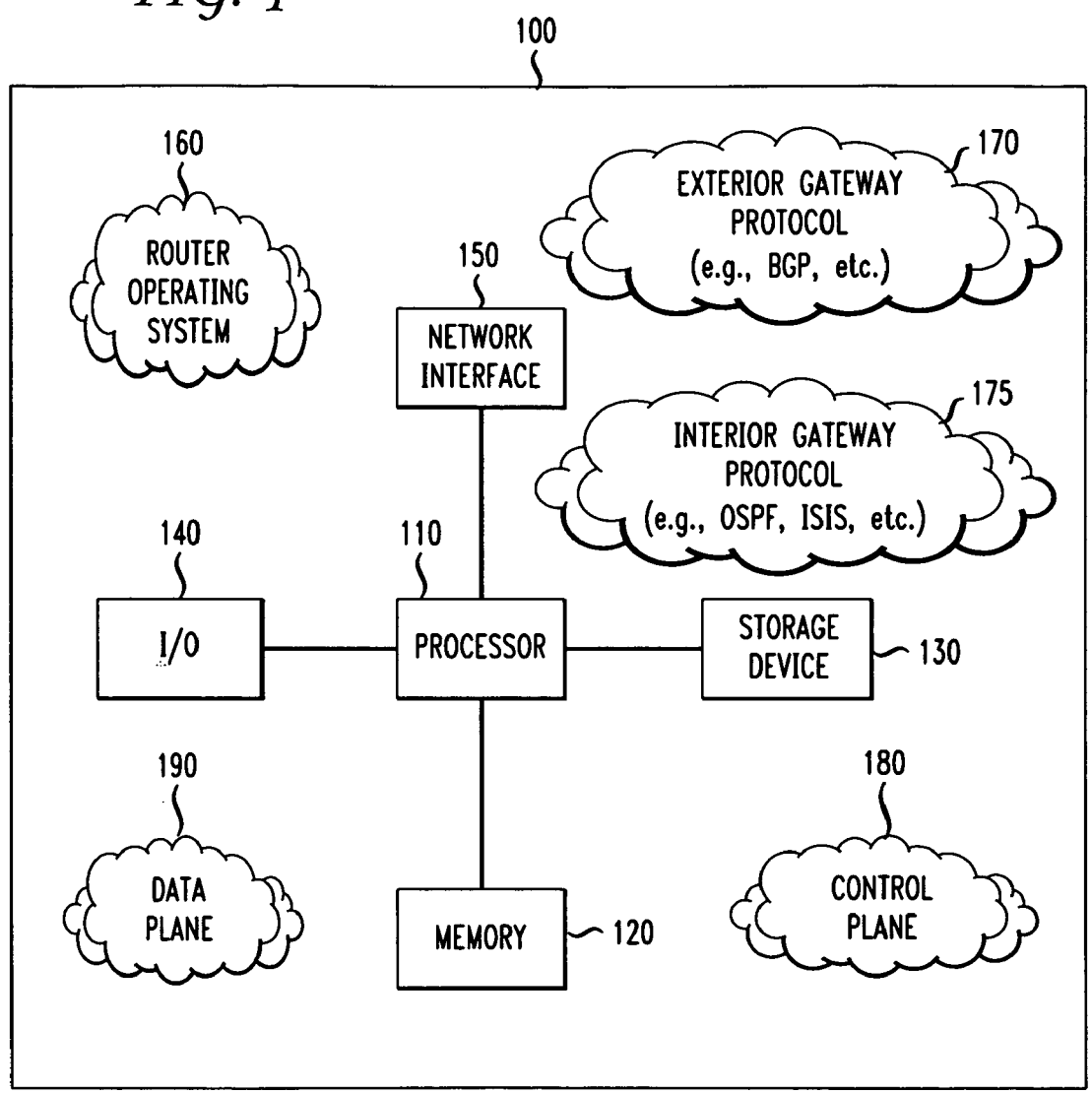
FIG. 1 is a high level diagram of a router that can be configured to be a border router, RR, or any other router configuration necessary for implementation of the method and system described herein.

FIG. 1 is a high level block diagram of an exemplary router 100 suitable for use in performing the functions described herein. Router 100 comprises a processor 110 (e.g., a central processing unit ("CPU")), a memory 120 (e.g., random access memory ("RAM") and/or read only memory ("ROM")), a storage device 130 (e.g., tape drive, floppy drive, hard disk drive, compact disk drive, etc.), various input/output devices 140 (e.g., display, keyboard, mouse, speakers, buttons, etc.), and a network interface 150.

Router 100 runs a router operating system 160 and can be configured with BGP software 170 and IGP software 175. Router 100 can also be configured as a Provider Edge ("PE") router in a Multi Protocol Label Switching ("MPLS") Virtual Private Network ("VPN") running eBGP to peer with a customer edge ("CE") router and iBGP to peer with a RR.

The processor 110 controls the overall operation of router 100 by executing computer program instructions from router operating system 160 and routing protocols 170 and 175. The computer program instructions may be stored in storage device 130 or any other computer-readable medium, and loaded into memory 120 when the router operating system 160 boots.

Router 100 is configured by software with a control plane process 180 that is responsible for building and maintaining the Internet Protocol ("IP") routing table, which can define where an IP packet should be routed to based on a "next hop" IP address and the egress interface that the "next hop" is reachable from. In other words, the control plane is the part of the router architecture that is concerned with drawing the network map or the information in a routing table that defines what to do with incoming packets. Control plane operations typically require an understanding of routing protocols and hence require some intelligence that is capable of supporting the complex algorithms and data structures associated with protocols such as IGP and BGP. The control plane operations required might vary between different routers depending on the routing protocol(s) configured. For example, a BGP withdrawal of a particular route can delete the "next hop" and egress interface for that route from the routing table.

Router 100 is also configured by software with a data plane process 190 that is responsible for actually routing an IP packet based upon information learned by the control plane 180. The data plane operations 190 are typically simple and fixed, since a packet is routed similarly regardless of the routing protocol used. The disclosed method can be a series of programming instructions executing in memory 120. A user can interact or configure the router 100 via input/output interface 140. Router 100 can have multiple network interfaces 150 for communicating with other routers or nodes in a network. One skilled in the art will recognize that an implementation of an actual router may contain different components or configurations and that FIG. 1 is a high level representation of some of the components of such a router for illustrative purposes.

Figure 2:
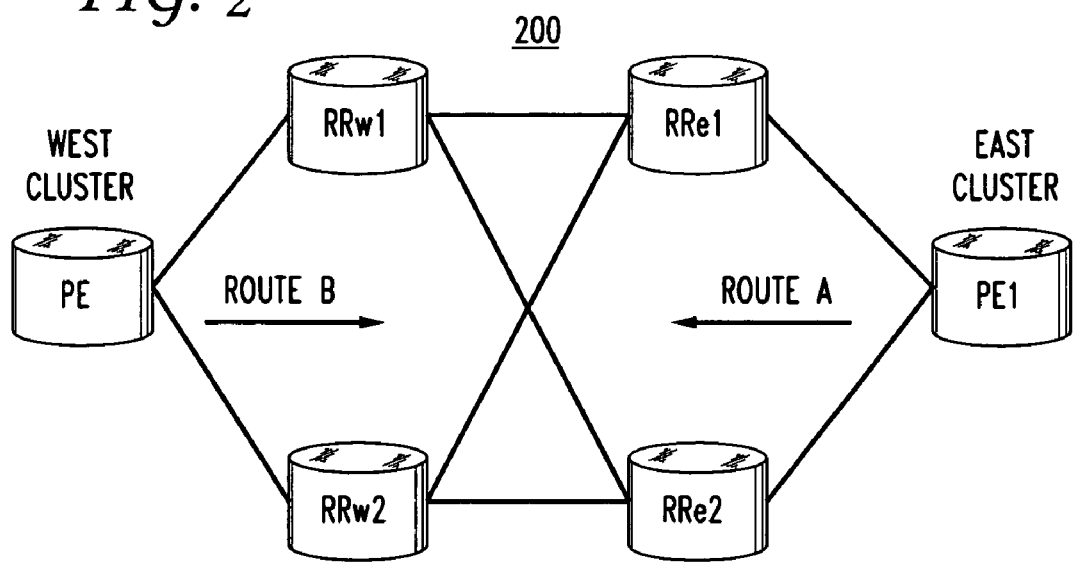
FIG. 2 is a schematic of an exemplary communication network or system having a route reflector topology.

FIG. 2 is a schematic of an exemplary communication network or system 200 having a route reflector ("RR") topology. In this exemplary embodiment, the network 200 comprises a plurality of route reflectors RRw1, RRw2, RRe1, RRe2 split into two geographical clusters, an East Cluster and a West Cluster. Each cluster services relevant provider edge ("PE") routers in that geographic region. For redundancy purposes, each PE router peers with both route reflectors in its geographical region. For example, route reflectors RRw1 and RRw2 service provider edge router PE in the West Cluster, and route reflectors RRe1 and RRe2 service provider edge router PE1 in the East Cluster.

Figure 3:
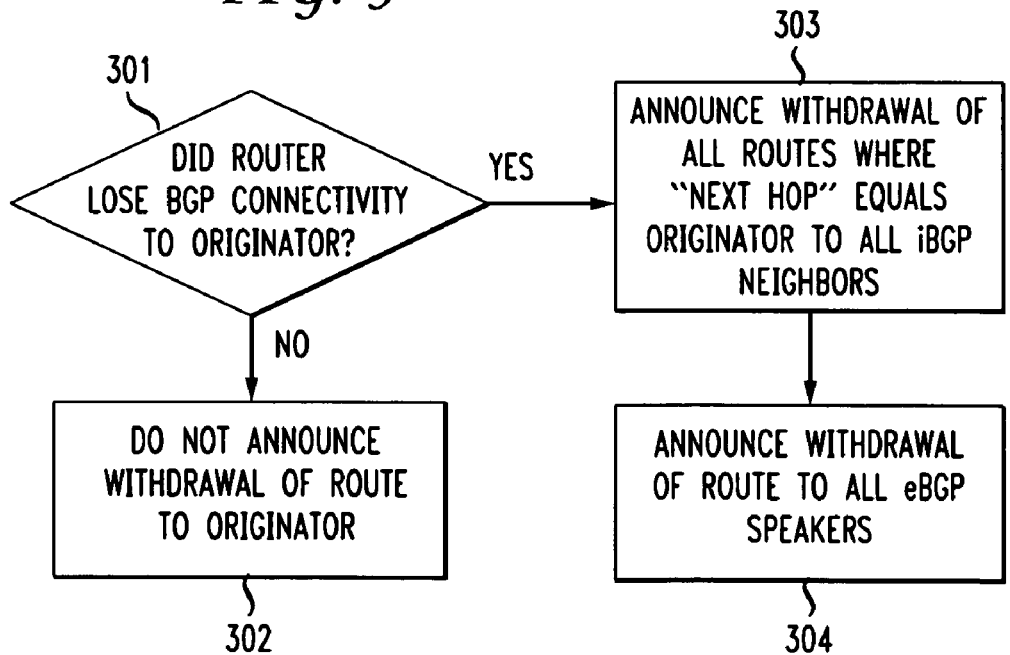
FIG. 3 is flow chart illustrating a main sequence of steps for withdrawing all routes to an originator in the event of an originator failure.

FIG. 3 is flow chart illustrating a main sequence of steps performed by a router or similar device for withdrawing all routes to an originator or provider edge ("PE") router in the event of an originator failure. In step 301, the system determines whether a router lost a BGP connection to an originator router. If there is no loss of connection to an originator router, then the system proceeds to step 302 and does not propagate a withdrawal of the route to the originator.

On the other hand, if there is a loss of BGP connectivity to an originator router, then the system announces a withdrawal of all routes to all AS neighbors via iBGP having a "next hop" attribute equal to or otherwise associated with the originator in step 303 and announces a withdrawal of the route to any other eBGP speaker in step 304. For example, referring to FIG. 2, if originator PE of the West Cluster loses BGP connectivity to originator PE1 of the East Cluster, then originator PE propagates a BGP withdrawal for all routes having a "next hop" attribute equal to or otherwise associated with originator PE1. This occurs regardless of whether originator PE can access originator PE1 via IGP.

Figure 4:
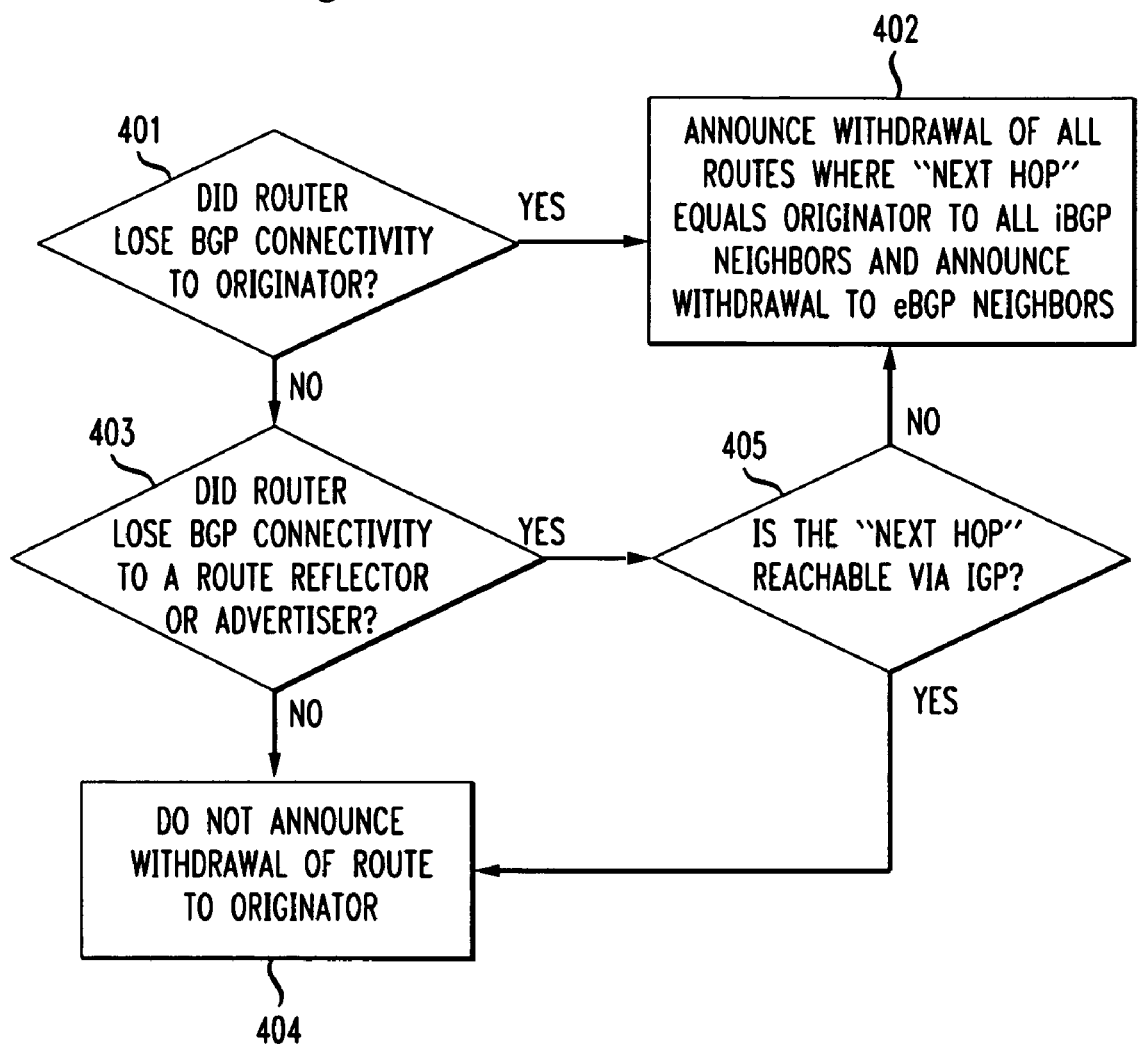
FIG. 4 is a flow chart illustrating a main sequence of steps performed by an originator for withdrawing or retaining routes depending on whether the originator or an advertiser has failed.

FIG. 4 is a flow chart illustrating a main sequence of steps performed by an originator for withdrawing or retaining routes depending on whether the originator or an advertiser has failed. In step 401, the system determines whether BGP connectivity to the originator was lost. If so, then the system propagates or announces a BGP withdrawal of all routes having a "next hop" attribute equal to or otherwise associated with that specific originator to all iBGP neighbors within the AS and any eBGP neighbors in step 402.

On the other hand, if it is determined in step 401 that BGP connectivity was not lost to an originator, then the system determines whether BGP connectivity to an advertiser or RR was lost in step 403. If not, then the system retains all valid routes and abstains from propagating or announcing any withdrawal message of routes having a "next hop" attribute equal to or otherwise associated with the originator in step 404.

If it is determined that the router lost BGP connectivity to an advertiser or RR in Step 403, then the system determines whether the originator or "next hop" is reachable via IGP in step 405. If yes, then the system retains all valid routes and abstains from propagating or announcing any withdrawal message of routes having a "next hop" attribute equal to or otherwise associated with the originator in step 404. If the originator or "next hop" is not reachable via IGP in step 405, then, in step 402, the system propagates or announces a BGP withdrawal of all routes having a "next hop" attribute equal to or otherwise associated with the originator to all iBGP neighbors within the AS and any eBGP neighbors.

FIG. 5 is a flow chart illustrating a main sequence of steps performed by an advertiser or RR for withdrawing or retaining routes depending on whether an originator or an advertiser has failed. In step 501, the system determines whether the advertiser or RR lost BGP connectivity to the originator. If BGP connectivity is lost to the originator, then the system determines whether the originator is still visible in the IGP domain in step 502. If the originator is still visible in the IGP domain, then the system retains all valid routes and abstains from propagating or announcing a BGP withdrawal of all routes having a "next hop" attribute equal to or otherwise associated with the originator in step 503. If, on the other hand, the originator is no longer visible in the IGP domain, then, in step 504, the system propagates or announces a BGP withdrawal of all routes having a "next hop" attribute equal to or otherwise associated with the originator to all iBGP neighbors within the AS and any eBGP neighbors Referring back to step 501 in FIG. 5, if the advertiser or RR did not lose connectivity to the originator, then, in step 505, the system determines whether the advertiser or RR lost BGP connectivity to another advertiser or RR in step 505. If so, then the system proceeds to step 503, retains all valid routes and abstains from propagating or announcing a BGP withdrawal of all routes having a "next hop" attribute equal to or otherwise associated with the originator. If it is determined in step 505 that the advertiser or RR has not lost BGP connection to another advertiser or RR, then no action is taken in step 506.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein. For example, although described in the context of BGP, it is understood that this disclosure is not limited to BGP and can also be implemented with other routing protocols. In addition, the disclosed method and system could work in many different topologies other than the ones illustrated herein.

What is claimed is:

1. A method for retaining routes in a control plane learned by an inter-domain routing protocol in an event of a connectivity failure between a first router and a second router, comprising:

classifying the first router as one of a route reflector and an originator;

classifying the second router as one of the route reflector and the originator;

determining whether a particular originator is still visible in an interior gateway protocol domain in response to determining that the connectivity failure occurred between the particular originator and a particular route reflector, wherein the particular route reflector is one of the first router and the second router and the particular originator is the other of the first router and the second router;

determining whether to propagate a withdrawal of learned routes having a next hop attribute equal to the particular originator based on classification of the first router, classification of the second router, and whether the particular originator is still visible in the interior gateway protocol domain;

determining whether to abstain from propagating the withdrawal of learned routes if the connectivity failure occurred between the particular route reflector and the particular originator, and the particular originator is accessible via an intra-domain routing protocol;

abstaining from propagating a withdrawal of learned routes based on classification of the first router as a route reflector and classification of the second router as a route reflector; and propagating a withdrawal of learned routes associated with an originator based on classification of the first router as an originator and classification of the second router as an originator.

2. The method according to claim 1, further comprising propagating a withdrawal of learned routes associated with an originator if the connectivity failure occurred between a route reflector and an originator, and the originator is inaccessible via an intra-domain routing protocol.

3. The method according to claim 1, wherein the inter-domain routing protocol is an exterior gateway protocol.

4. The method according to claim 3, wherein the exterior gateway protocol is a border gateway protocol.

5. The method according to claim 1, wherein the intra-domain routing protocol is an interior gateway protocol.

6. A system for retaining routes in a control plane learned by an inter-domain routing protocol in an event of a connectivity failure between a first router and a second router, comprising:

a memory storing computer program instructions;

a processor communicatively coupled to the memory, the processor configured to execute the computer program instructions, which, when executed on the processor, cause the processor to perform operations comprising;

classifying the first router as being one of a route reflector and an originator;

classifying the second router as one of the route reflector and the originator;
determining whether a particular originator is still visible in an interior gateway protocol domain in response to determining that the connectivity failure occurred between the particular originator and a particular route reflector, wherein the particular route reflector is one of the first router and the second router and the particular originator is the other of the first router and the second router;
determining whether to propagate a withdrawal of learned routes having a next hop attribute equal to the particular originator based on classification of the first router, classification of the second router, and whether the particular originator is still visible in the interior gateway protocol domain;
determining whether to abstain from propagating the withdrawal of learned routes if the connectivity failure occurred between the particular route reflector and the particular originator, and the particular originator is accessible via an intra-domain routing protocol;
abstaining from propagating a withdrawal of learned routes based on classification of the first router as a route reflector and classification of the second router as a route reflector; and
propagating a withdrawal of learned routes associated with an originator based on classification of the first router as an originator and classification of the second router as an originator.

7. The system according to claim 6, further comprising:
determining whether an originator is accessible via an intra-domain routing protocol.

8. The system according to claim 7, wherein the intra-domain routing protocol is an interior gateway protocol.

9. The system according to claim 6, further comprising propagating a withdrawal of learned routes associated with an originator if the connectivity failure occurred between a route reflector and an originator, and the originator is inaccessible via an intra-domain routing protocol.

10. The system according to claim 6, wherein the inter-domain routing protocol is an exterior gateway protocol.

11. The system according to claim 10, wherein the exterior gateway protocol is a border gateway protocol.

12. A computer-readable storage device storing computer program instructions for retaining routes in a control plane learned by an inter-domain routing protocol in an event of a connectivity failure between a first router and a second router, the computer program instructions, which when executed on a processor, cause the processor to perform operations comprising:

classifying the first router as one of a route reflector and an originator;
classifying the second router as one of the route reflector and the originator;
determining whether a particular originator is still visible in an interior gateway protocol domain in response to determining that the connectivity failure occurred between the particular originator and a particular route reflector, wherein the particular route reflector is one of the first router and the second router and the particular originator is the other of the first router and the second router;
determining whether to propagate a withdrawal of learned routes having a next hop attribute equal to the particular originator based on classification of the first router, classification of the second router, and whether the particular originator is still visible in the interior gateway protocol domain;
determining whether to abstain from propagating the withdrawal of learned routes if the connectivity failure occurred between the particular route reflector and the particular originator, and the particular originator is accessible via an intra-domain routing protocol
abstaining from propagating a withdrawal of learned routes based on classification of the first router as a route reflector and classification of the second router as a route reflector; and
propagating a withdrawal of learned routes associated with an originator based on classification of the first router as an originator and classification of the second router as an originator.

13. The computer-readable storage device according to claim 12, the operations further comprising propagating a withdrawal of learned routes associated with an originator if the connectivity failure occurred between a route reflector and an originator, and the originator is inaccessible via an intra-domain routing protocol.

14. The computer-readable storage device according to claim 12, wherein the inter-domain routing protocol is an exterior gateway protocol.

15. The computer-readable storage device according to claim 14, wherein the exterior gateway protocol is a border gateway protocol.

16. The computer-readable storage device according to claim 12, wherein the intra-domain routing protocol is an interior gateway protocol.

\* \* \* \* \*